US005987381A

United States Patent [19]
Oshizawa

[11] Patent Number: 5,987,381
[45] Date of Patent: Nov. 16, 1999

[54] AUTOMOBILE NAVIGATION SYSTEM USING REMOTE DOWNLOAD OF DATA

[75] Inventor: Hidekazu Oshizawa, Cupertino, Calif.

[73] Assignee: Visteon Technologies, LLC, Sunnyvale, Calif.

[21] Appl. No.: 08/816,107

[22] Filed: Mar. 11, 1997

[51] Int. Cl.[6] .............................................. G06F 165/00
[52] U.S. Cl. ........................ 701/209; 701/202; 701/210; 340/990; 340/995
[58] Field of Search .................................. 701/202, 207, 701/208, 209, 210, 211; 73/178 R; 340/988, 990, 995, 989

[56] References Cited

U.S. PATENT DOCUMENTS

| | | | |
|---|---|---|---|
| 4,301,506 | 11/1981 | Turco ........................................ | 364/436 |
| 4,350,970 | 9/1982 | von Tomkewitsch ...................... | 340/23 |
| 4,796,191 | 1/1989 | Honey et al. ............................. | 364/450 |
| 4,812,843 | 3/1989 | Champion, III et al. ................ | 340/905 |
| 4,914,605 | 4/1990 | Loughmiller, Jr. et al. ............. | 364/518 |
| 4,954,958 | 9/1990 | Savage et al. ............................. | 701/202 |
| 5,172,321 | 12/1992 | Ghaem et al. ............................ | 340/995 |
| 5,177,685 | 1/1993 | Davis et al. .............................. | 364/443 |
| 5,184,303 | 2/1993 | Link .......................................... | 364/449 |
| 5,523,950 | 6/1996 | Peterson ................................... | 364/436 |
| 5,544,061 | 8/1996 | Morimoto et al. ....................... | 701/202 |
| 5,745,867 | 4/1998 | Mills ......................................... | 701/202 |
| 5,774,827 | 6/1998 | Smith, Jr. et al. ....................... | 701/202 |
| 5,845,227 | 12/1998 | Peterson ................................... | 701/209 |
| 5,862,509 | 1/1999 | Desai et al. .............................. | 701/202 |

FOREIGN PATENT DOCUMENTS

| | | |
|---|---|---|
| 0123562 | 4/1984 | European Pat. Off. . |
| WO 90/02391 | 8/1989 | WIPO . |
| WO 92/10808 | 10/1991 | WIPO . |
| WO 92/14215 | 2/1992 | WIPO . |

OTHER PUBLICATIONS

Duncan, Don, "RESCU, remote emergency satellite cellular unit," *Proceedings of the National Technical Meeting, Institute of Navigation 1996*, E.I. Conference No. 45483, pp. 361–366.

Abstract, Martin, Norman, "Look to the sky automakers plug into automatic communication systems," *Chilton's Automotive Industries*, v. 176, No. 3, Mar. 1996, pp. 74–75.

Abstract, Demmler, Al, "OnStar," *Automotive Engineering*, v. 104, Jun. 1996, pp. 85–86.

Abstract, Mateja, Jim, "Safety system dials 9–1–1 for motorists," *Traffic Safety*, v. 96, Jul./Aug. 1996, pp. 4–5.

Abstract, Schofield, Julie Anne, "Electronics create the cybercar," *Design News*, v. 50[51], Oct. 9, 1995, pp. 116–118.

*Primary Examiner*—Gary Chin
*Attorney, Agent, or Firm*—Blakely, Sokoloff, Taylor & Zafman LLP

[57] ABSTRACT

A method of enabling an on-board vehicle navigation system to compute a route from a current position of the vehicle to a desired destination is provided. A user of the navigation system in a vehicle utilizes a cellular telephone or any other wireless, two-way audio communications link to contact an operator in a remote communications center. The user informs the operator of his desired destination. The operator in the communications center accesses a computer database to determine the exact location of the desired destination in terms of latitude/longitude, street address, or other similar information. The operator then causes the information specifying the exact location to be transmitted from the communications center to the on-board vehicle navigation system over a data link. The on-board vehicle navigation system receives the location information and uses it to compute a route from the vehicle's current position to the desired destination.

43 Claims, 4 Drawing Sheets

AUTOMOBILE NAVIGATION SYSTEM USING REMOTE DOWNLOAD OF DATA

FIELD OF THE INVENTION

The present invention pertains to the field of on-board navigation systems for street vehicles. More particularly, the present invention relates to an on-board automobile navigation system which uses data downloaded from a remote transmission source.

BACKGROUND OF THE INVENTION

An on-board navigation system can be advantageous to a driver of an automobile when navigating streets in an unfamiliar area. Such systems are often found in rental cars and are becoming increasingly more available as options in new cars. An on-board navigation system may include a computer, a stored street map database, and various sensors to detect vehicle movement. The system is designed to compute a route to a selected destination and generate guidance instructions to guide the user along the computed route. The system may include a visual display device, such as a liquid crystal display (LCD), by which navigation information and other information are provided to the user. For example, the system might display a moving vehicle symbol on an image of a street map to indicate the movement of the vehicle through a given area. The system might also display symbolic or textual navigation instructions, such as a directional arrow to indicate the next turn, or the instruction, "Right turn on Innsbruck Drive." Visual navigation instructions may be accompanied by audible instructions generated as digitized or synthesized speech. The system generally includes some type of input device, such as push buttons, to allow the user to select a destination and perform various functions, such as changing the scale level of the map display. On-board automobile navigation systems having features such as those mentioned above are produced by Zexel USA Corporation, located in Sunnyvale, Calif.

One problem with many on-board navigation systems is that the manner of selecting the desired destination is inconvenient for some users. With one existing system, the driver pushes buttons to select a destination from a displayed list of possible destinations. The user first selects a city from a list of cities, then selects a street name from a list of street names, and then selects a street number. Some people, however, dislike having to manually input the destination. In some cases, the user may be in a hurry and may not wish to be delayed by having to input the destination. Further, certain people are apprehensive about using even relatively simple electronic devices; having to manually input a destination may tend to discourage such people from using a navigation system. Hence, it is desirable to provide an on-board automobile navigation system which simplifies the process of entering a desired destination for the user.

Another problem with many on-board navigation systems is that they tend to be expensive; on-board navigation systems in new cars are still generally among the highest-priced options. It is desirable, therefore, to reduce the overall cost of on-board navigation systems to make such systems more available to consumers. One significant factor in the cost of these systems is the visual display device and its associated hardware, which typically represent a large fraction of the cost of the entire system (approximately 30 percent in at least one existing system). It would advantageous, therefore, to reduce or eliminate costs associated with these components without sacrificing the essential functionality of the navigation system and without reducing the appeal of the system to consumers.

Thus, it is desirable to provide an on-board automobile navigation system which simplifies the process of entering a desired destination for the user. It is further desirable to reduce the cost of such a system while preserving the ability of the system to provide clear, step-by-step navigation instructions along a computed route to guide the user to a selected destination.

SUMMARY OF THE INVENTION

The present invention pertains to a method of enabling an on-board vehicle navigation system to a compute a route from a current position of the vehicle to a desired destination. In the method, a voice transmission is received from a user. The voice transmission includes information identifying the desired destination. A database is then accessed to determine the location of the desired destination based on the information identifying the desired destination. Once the location of the desired destination is identified, a data transmission is sent to the on-board navigation system. The data transmission includes information specifying the location of the desired destination, which can be used by the on-board vehicle navigation system to compute the route.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An on-board automobile navigation system is described which uses destination data downloaded from a remote transmission source. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

Overall System Architecture

Figure 1:
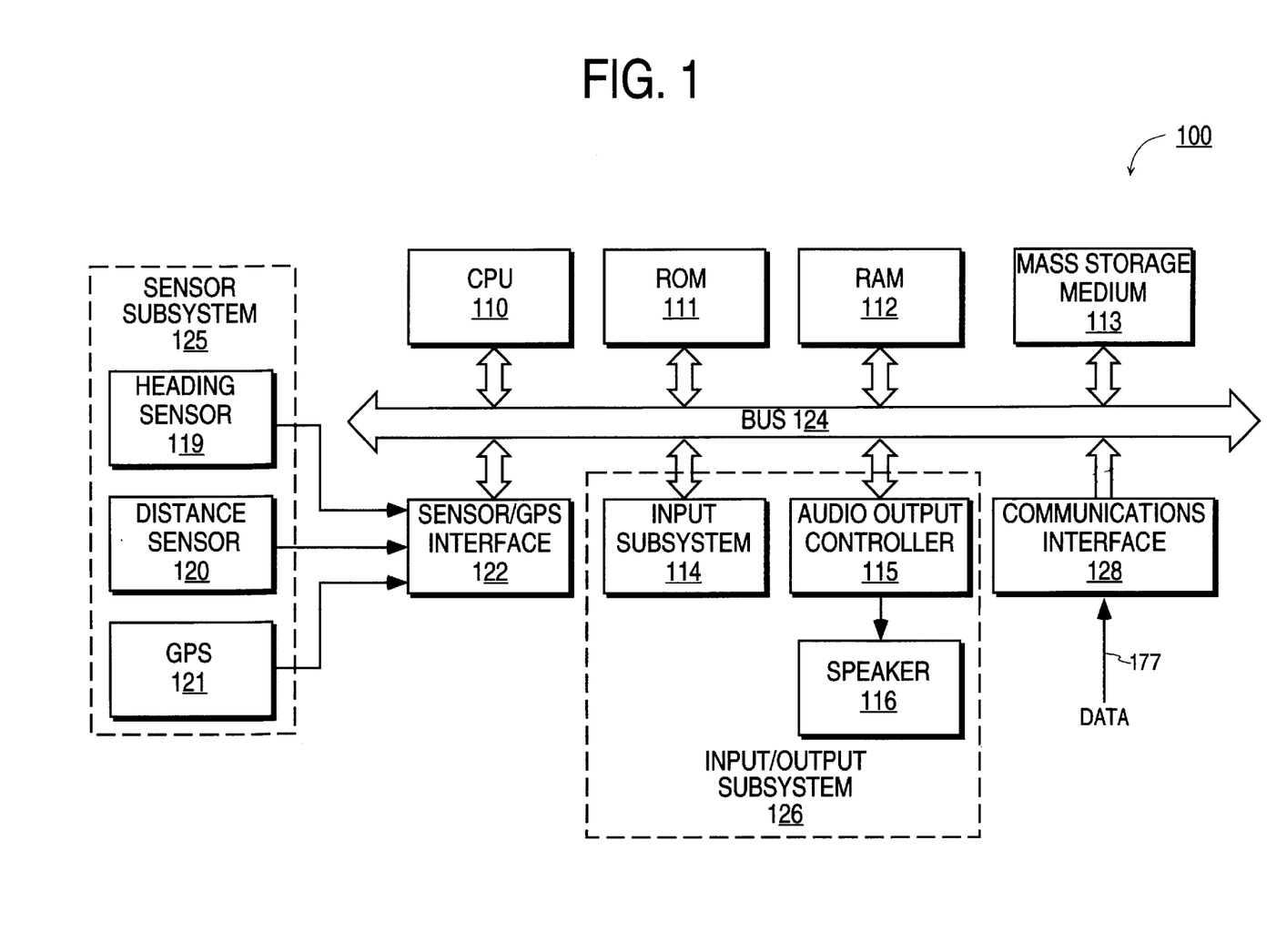
FIG. 1 illustrates an on-board automobile navigation system.

FIG. 1 illustrates an on-board automobile navigation system 100. The navigation system 100 includes a central processing unit (CPU) 110, read-only memory (ROM) 111, random access memory (RAM) 112, and a mass storage medium 113, each coupled to a bus 124. The bus 124 may actually comprise two or more physical buses coupled together by various bridges and/or adapters. Also coupled to the bus 124 is an input/output (I/O) subsystem 126. The I/O subsystem 126 includes an input subsystem 114 coupled to the bus 124, which provides the means for a user (e.g., a driver or passenger of the vehicle) to control various functions of the navigation system 100. The I/O subsystem 126 also includes an audio speaker 116, which receives signals from an audio output controller 115 that is coupled to the bus 124.

A sensor subsystem 125 is also coupled to the bus 124 via an interface device 122. The sensor subsystem 125 includes a heading sensor 119, a distance sensor (e.g., odometer) 120, and a global positioning system (GPS) receiver 121, each of which is coupled to the interface device 122. The interface device 122 formats the data received from sensors 119 and 120 and GPS receiver 121 for transmission to the CPU 110 via the bus 124.

Figure 2A:
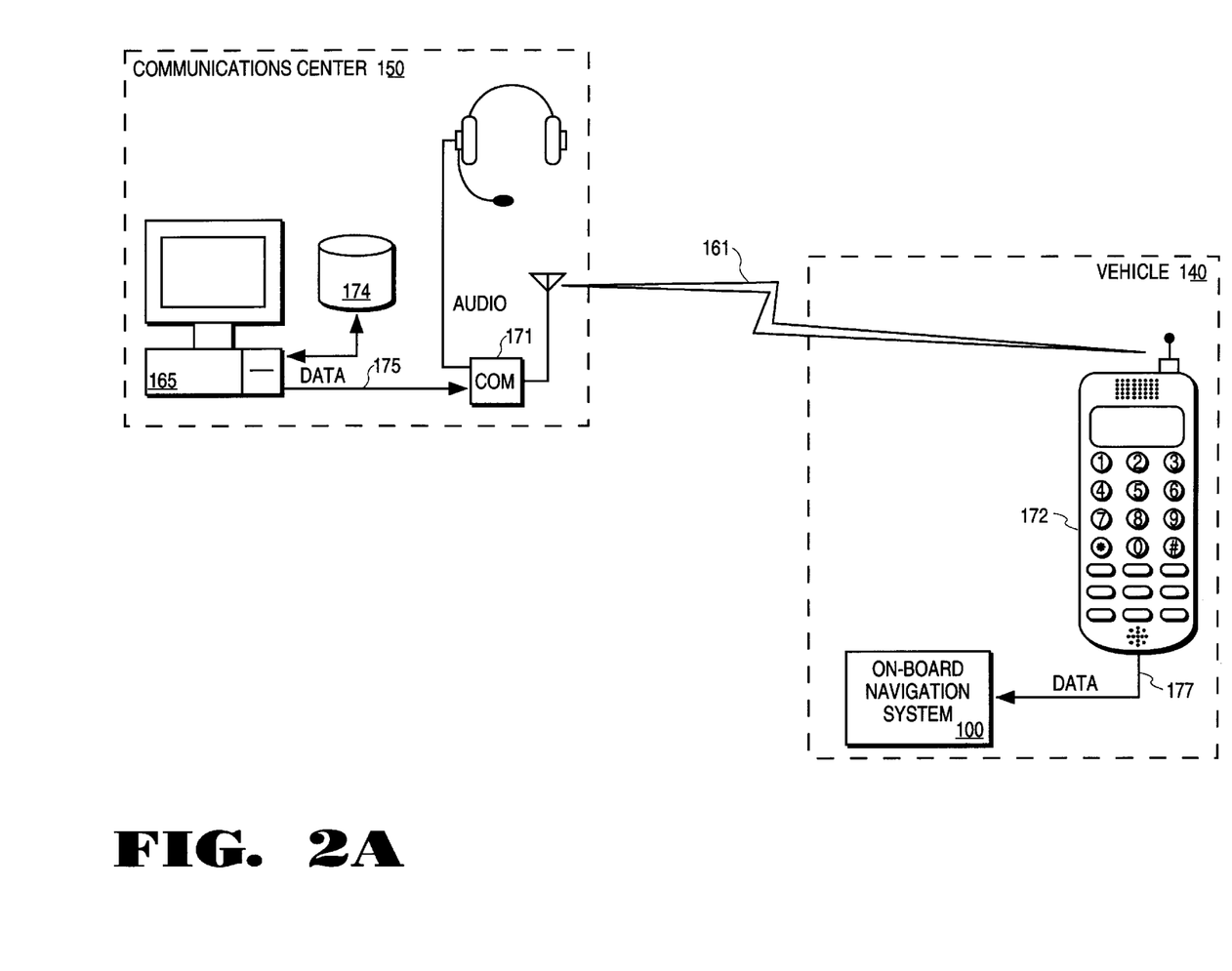
FIG. 2A illustrates a configuration by which both audio data and non-audio data are communicated between a communications center and an on-board automobile navigation system using separate channels of a single communication link.

Also coupled to the bus 124 is a communication interface 128. Interface 128 provides an interface between the bus 124 and an external communication device 172, which is discussed further in connection with FIG. 2.

Various substitutions and variations may be made for many of the components of the navigation system 100 within the scope of the present invention. For example, mass storage medium 113 may be any suitable form of non-volatile storage device, including a magnetic or optical storage disk, e.g., a CD-ROM (Compact Disk-ROM), CD-R (CD-Recordable), DVD (Digital Versatile Disk), or the like. In one embodiment, mass storage medium 113 is a PCMCIA (Personal Computer Memory Card International Association) hard drive. Further, mass storage medium 113, ROM 111, and RAM 112 each may represent multiple physical devices. The input subsystem 114 may include mechanical buttons, pressure- or thermal-sensitive buttons, a voice-activated input system, or any other suitable substitute. Various substitutions may also be made for the sensors 119, 120, and 121 of the sensor subsystem 125. For example, the GPS receiver 121 may be replaced with any alternative form of high-accuracy locating system. Also, the heading sensor 119 may be either an absolute heading detector, such as a compass, or a relative heading detector, such as a wheel differential angular velocity sensor. It will be recognized that the above-mentioned substitutions are only illustrative; other substitutions can be made within the scope of the present invention.

It must be noted that, although many on-board navigation systems include a visual display subsystem, the system 100 of FIG. 1 does not include such a subsystem, according to one embodiment of the present invention. As will be described below, a visual display subsystem can be omitted without sacrificing the performance of the navigation system. Note, however, that in alternative embodiments, a simple display subsystem with minimal functionality (e.g. text only display) may be included in the on-board navigation system 100. In that case, the display device and any associated hardware can be coupled to bus 24 in a manner that is well within the capabilities of those skilled in the art and need not be described herein.

System Operation

The on-board navigation system 100 includes a database of street map data, which, in one embodiment, is stored in mass storage medium 113. In one embodiment, streets are represented in the map database as combinations of street segments ("links") that are interconnected at various points ("nodes"). As the vehicle travels, the system 1 uses a technique called "deadreckoning" in which data from the heading sensor 119 and the distance sensor 120 are processed to determine a change in relative position from a previously-computed position. Because dead-reckoning is subject to a certain amount of positioning error, the system 100 uses a map-matching algorithm to periodically reduce or eliminate such error. The map-matching algorithm causes the system 100 to reference the computed dead-reckoned position against the stored map data and, if necessary, to revise the position determination accordingly (e.g., if the dead-reckoned position does not coincide with a street segment). In certain instances, data from the GPS receiver 121 may be used to correct, supplement, or replace the position determination made using dead-reckoning and map-matching.

The on-board navigation system 100, after inputting a desired destination in the manner which is described below, uses the stored map data to compute a route from the current position of the vehicle to the desired destination. Various techniques are known in the art for computing a route based on such data. As the vehicle travels, the system 100 outputs audible navigation instructions to the user via the speaker 116 in the form of recorded (e.g., digitized) or synthesized speech, to guide the user along the computed route to the destination. Generally, an audible instruction prompts each significant action (i.e., each turn) that the driver must perform.

It will be understood that many functions of the on-board navigation system 100 are carried out in response to its CPU 110 executing sequences of instructions that are contained in memory (e.g., ROM 111, RAM 112, mass storage medium 113, or a combination thereof). That is, execution of the sequences of instructions contained in memory causes the CPU 110 to perform certain steps of the present invention, which are described below. For example, the instructions may be loaded into RAM 112 for execution from ROM 111 or mass storage medium 113. In other embodiments, hard-wired circuitry may be used in place of, or in combination with, software instructions to implement aspects of the present invention. Thus, the present invention is not limited to any specific combination of hardware circuitry and software, nor to any particular source for the instructions executed by the navigation system 100.

Remote Download to On-Board Navigation System

The present invention simplifies the process of entering a desired destination for the user. As noted above, certain on-board automobile navigation systems use a display device to allow the user to select a destination and to present navigation instructions to the user. However, because a display device has not been included in the navigation system 100 (according to one embodiment), the present invention provides alternative means for performing these functions. In particular, navigation instructions are provided audibly via the speaker 116. It is believed that some users prefer audio navigation cues to visual navigation cues.

As to selection of a destination, it is recognized that one possible approach, in the absence of a display device, would be to equip the navigation system with voice recognition capability. However, while voice recognition technology has improved substantially in recent years, it is believed that such technology has not yet developed to the extent necessary to allow this information to be input vocally with sufficient consistency and accuracy.

According to the present invention, therefore, a communications center 150 is provided, which includes a computer system 165 used by a human operator, as illustrated in FIG. 2A. The computer system 165 has access to a database 174. The computer system 165 can be any conventional computer system, such as a personal computer (PC) including standard components such as a CPU, memory, and various I/O devices. It will be understood that functions of the computer system 165 that are required to practice the present invention are generally carried out in response to the CPU (not shown) of the computer system 165 executing sequences of instructions that are contained in memory (not shown); however, certain functions may be implemented using hardwired circuitry.

The present invention further provides for real-time, two-way audio communication between a user of the on-board navigation system 100, which is located in a vehicle 140, and a human operator of the computer system 165 in the communication center 150. The present invention also provides for non-audio data communication between the computer system 165 and the on-board navigation system 100. In one embodiment, both the audio and non-audio data communication are accomplished using a single communication link 161 between a communication device 171 coupled to the computer system 165 and a communication device 172 coupled to the on-board navigation system 100. The link 161 includes both an audio (voice) channel and a non-audio (data) channel.

The link 161 may be any suitable form of wireless communication link. A substantial distance may exist between the vehicle 140 and the communications center 150 (i.e., many miles). Therefore, the link 161 may be a radio frequency (RF) link, such as a cellular telephone link, citizens band (CB) radio, or any other suitable type of wireless communication link. The link 161 may include satellites, microwave towers, or other similar devices functioning as signal relay points, repeaters, amplifiers, and the like.

In the embodiment illustrated in FIG. 2A, the communication device 171 is coupled to the computer system 165 by a data path 175. A headset is coupled to the communications device 171 and is used by the operator to input and output audio information to and from the communication device 171. Communication device 171 transmits audio and non-audio data onto separate channels of link 161 and receives at least audio data from communication device 172. Communication device 172 is similar to device 171 and is coupled to the on-board navigation system 100 by data path 177. Communication device 172 receives both audio and non-audio data from communication device 171. Data path 177 is input to interface 128 (FIG. 1) to provide certain non-audio data to the navigation system 100, as will be discussed below. It will be recognized that, in various embodiments, communication device 172 can be an integral component of the on-board navigation system 100; similarly, communication device 171 can be an integral component of the computer system 165.

The database 174 includes extensive, detailed information that is used for locating the user's desired destination. This information may include telephone directory white pages and/or yellow pages information, points of interest, etc. Some or all of the stored information may be obtained via a network (e.g., Internet) connection (not shown) between the computer system 165 and one or more remote service providers, in which case the stored information can be updated frequently and easily via the network. For example, telephone directory information might be obtained from a World Wide Web page provided by a remote server. In another embodiment, the entire database 174 may be located on a remote server and accessed via the network.

As will be described below, the database 174 may also include certain additional (secondary) information, such as real-time traffic information or information on crime rates in certain geographic areas. Such secondary information may also be stored in a separate database (not shown) that is accessible to computer system 165.

Figure 2B:
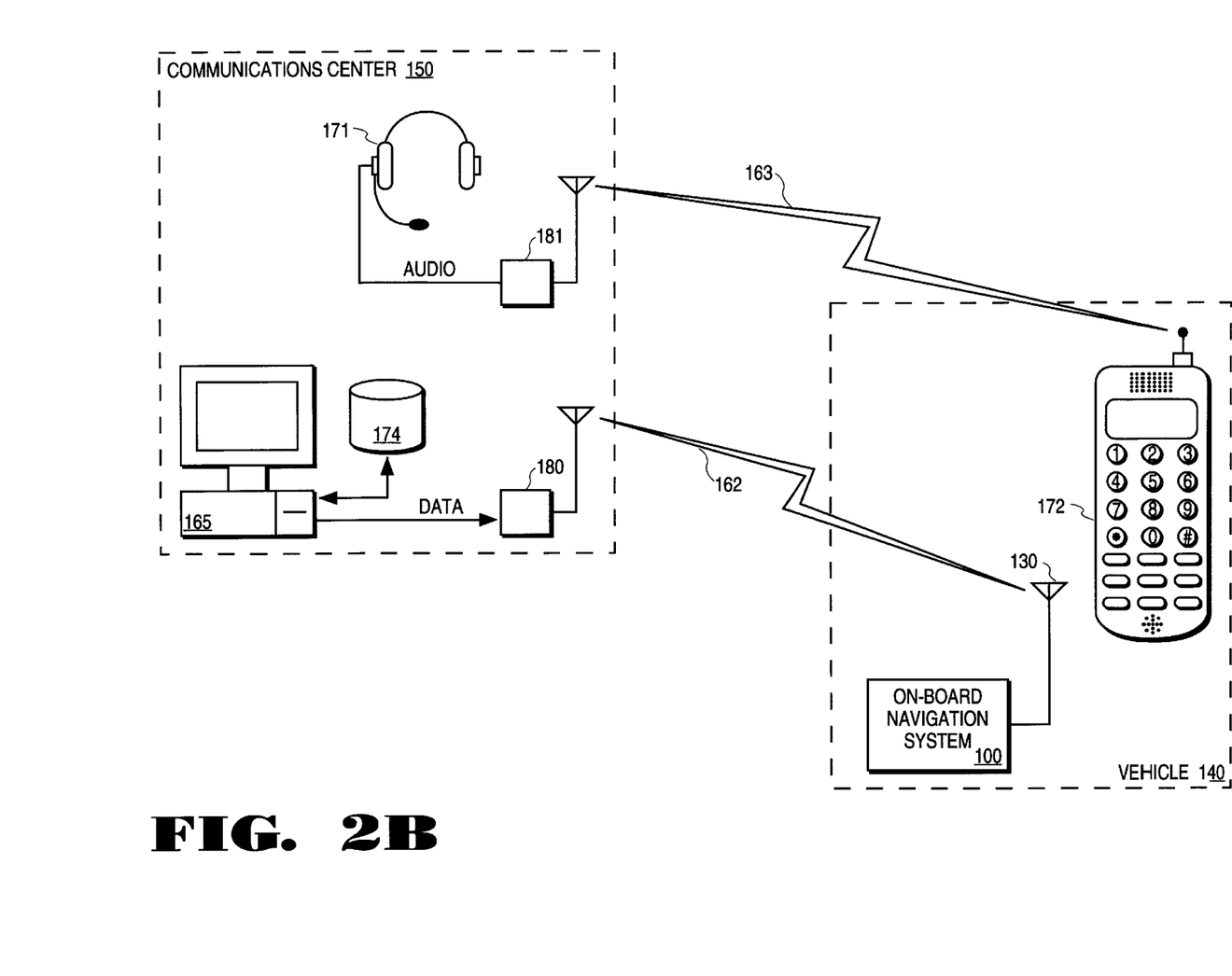
FIG. 2B illustrates a configuration by which audio and non-audio data are communicated between a communications center and an on-board automobile navigation system using separate communication links.

FIG. 2B illustrates an alternative embodiment in which the audio channel and the non-audio channel are implemented using separate communication links. In this embodiment, a communication device 181, which functions independently from the computer system 165, is used by the operator for voice communication with the user of the navigation system 100. Communication device 172 also functions independently from the on-board navigation system 100. Hence, link 163 includes only audio data communication between communication device 181 and communication device 172. Computer system 165 is coupled to a separate data communication device 180, which provides non-audio data communication with the on-board navigation system 100. Hence, link 162 includes only non-audio data communication between communication device 180 and the on-board navigation system 100. The on-board navigation system 100 includes a separate antenna 130 and receiver/decoder circuitry (not shown) suitable for receiving non-audio data from communication device 180. It will be recognized that various other embodiments are also possible.

Figure 3:
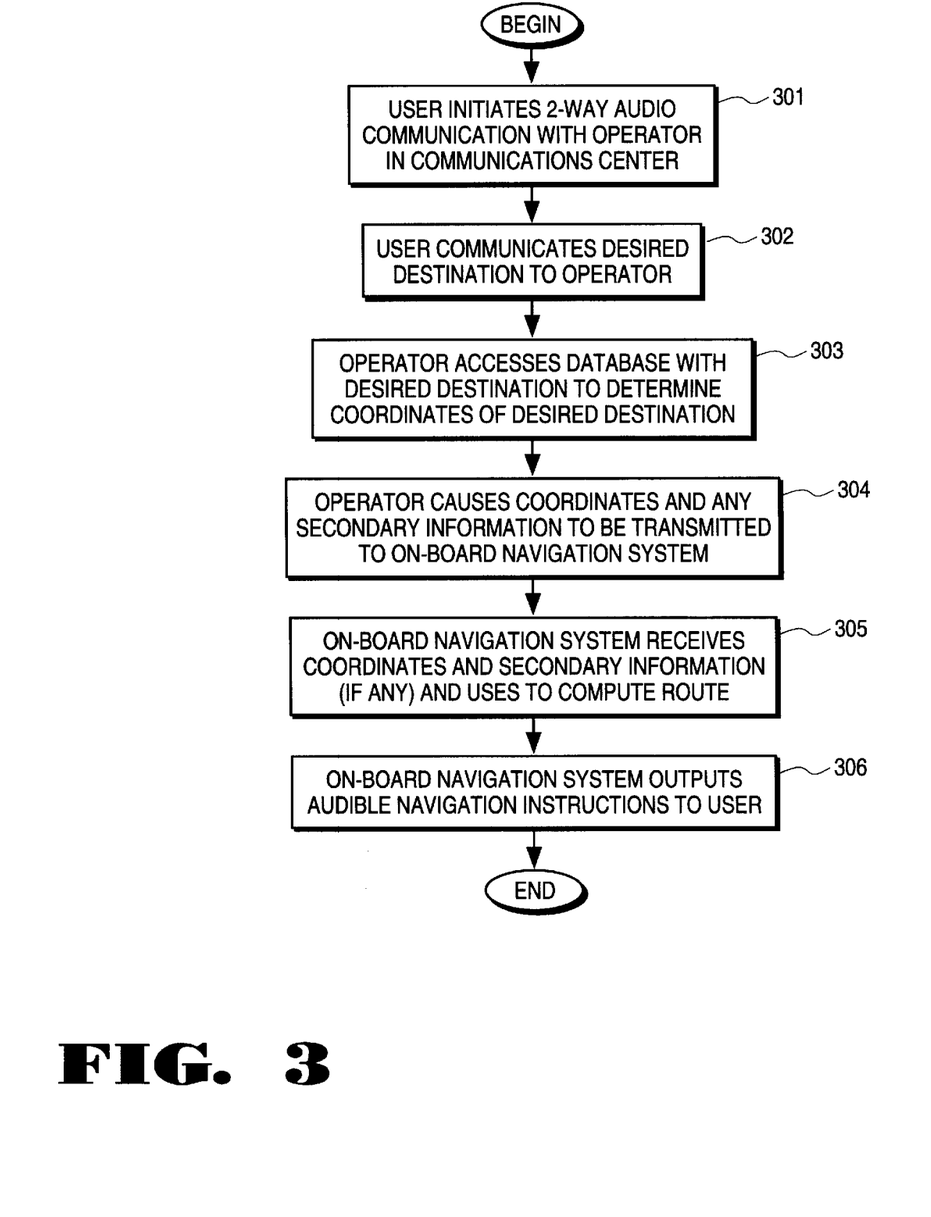
FIG. 3 is a flow diagram illustrating a routine for computing a route between a current position and a desired destination using data downloaded to an on-board automobile navigation system from a remote communications center.

FIG. 3 illustrates a routine of the present invention by which the location of the desired destination is determined and a route to the desired destination is computed. Referring now to FIGS. 2A and 3, assume that the user of the navigation system 100 wishes to receive navigation assistance. Hence, in step 301 he first uses communication device 172 (which may be a cellular telephone) to establish two-way audio communication with the operator in the communication center 150, who is using communication device 171; the user of navigation system 100 thereby initiates the communication link 161. In step 302, the user states the desired destination to the operator. For example, the user may provide the name of a business as the desired destination. In step 303, the operator uses the computer system 165 to access the database 174 to determine the exact coordinates of the desired destination in terms that are usable by the navigation system 100; for example, the navigation system may require that coordinates be provided in terms of latitude/longitude, street address, link (street segment) identifier, node (intersection) identifier, or other type of location information. This location information may be specified in terms of a unified (common) location code. It is envisioned that numerous other ways of specifying destination coordinates are possible. In step 304, the operator enters a command into the computer system 165 to cause the coordinates to be encoded and transmitted on from the communications center 150 to the on-board navigation system 100 via the non-audio data channel of link 161.

The transmission of the destination coordinates may be accompanied by transmission of certain additional (secondary) information, which may be used by the navigation system 100 in computing a route. The secondary information may include, for example, real-time traffic information or information on crime rates in the areas surrounding the destination, the current position of the vehicle, and points therebetween. The secondary information may be stored in, and retrieved from, database 174 or from a separate database (not shown) that is accessible to computer system 165.

In step 305, the on-board navigation system 100 receives (via data path 177) and decodes the coordinates and any secondary information and uses the decoded information to compute a route from the current position of the vehicle 140 to the desired destination. Computation of the route by the on-board system 100 tends to reduce the overall communication time, as compared to other possible techniques in which the route might be computed at a central location. Once the route is computed, the on-board navigation system 100 initiates guidance mode and outputs audible, step-by-step navigation instructions to the user in step 306 via the speaker 116 to guide the user to the destination. As the vehicles travels, the current position is periodically updated using dead-reckoning and map matching or any other suitable positioning technique.

In another embodiment of the present invention, the route to the desired destination is computed by the computer system 165 in the communication center 150, encoded, and then transmitted to the on-board navigation system 100 via data link 161. While such an embodiment may tend to increase communication time, it may also serve to further reduce the overall cost of the navigation system 100.

Thus, an on-board automobile navigation system has been described which uses destination data downloaded from a remote transmission source. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of enabling an on-board navigation system in a vehicle to compute a route from a current position of the vehicle to a desired destination, the method comprising the steps of:
    receiving a voice transmission from a user, the voice transmission including information identifying the desired destination;
    accessing a destination database to determine the location of the desired destination based on the information identifying the desired destination; and
    sending a data transmission to the on-board navigation system, the data transmission including information specifying the location of the desired destination and secondary information, the secondary information including crime rate information, such that the information specifying the location of the desired destination and the secondary information are usable by the on-board vehicle navigation system to compute the route from the current position of the vehicle to the desired destination.

2. A method according to claim 1, wherein the location comprises a latitude and longitude of the desired destination.

3. A method according to claim 1, wherein the location comprises a street address of the desired destination.

4. A method according to claim 1, wherein the step of receiving a voice transmission from a user is carried out using a radio frequency (RF) link.

5. A method according to claim 1, wherein the step of receiving a voice transmission from a user is carried out by cellular telephone.

6. A method according to claim 1, wherein the secondary information comprises real-time traffic information.

7. A method of providing route information to an on-board automobile navigation system, the method comprising the steps of:
    receiving an audio transmission from a user of the on-board automobile navigation system, the audio transmission including information indicating the desired destination;
    determining a current position of the automobile;
    computing a route from the current position of the automobile to the desired destination based on a street map database;
    sending a non-audio data transmission to the on-board automobile navigation system, the non-audio data transmission including information identifying the route and secondary information, the secondary information including crime rate information, wherein the information identifying the route and the secondary information are usable by the on-board automobile navigation system to determine and output a series of navigation instructions to the user.

8. A method according to claim 7, wherein the step of determining a current position of the automobile comprises the step of receiving a data transmission from the on-board automobile navigation system including information indicating the current position of the vehicle.

9. A method according to claim 7, wherein the step of receiving an audio transmission from a user is carried out using a radio frequency (RF) link.

10. A method according to claim 7, wherein the step of receiving an audio transmission from a user is carried out by cellular telephone.

11. A method according to claim 7, wherein the secondary information further comprises real-time traffic information.

12. In an on-board navigation system in an automobile, a method of determining a route from a current position of the automobile to a desired destination, the method including the steps of:
    determining the current position of the automobile;
    receiving a data transmission from a remote communication center, the data transmission including coordinates of the desired destination and additional information, the additional information including crime rate information; and
    using the received coordinates, the additional information and the current position of the automobile to compute the route from the current position of the automobile to the desired destination.

13. A method according to claim 12, further comprising the steps of, prior to receiving the data transmission from the communication center:
    inputting audio information from a user, the audio information including information for identifying the desired destination; and
    sending an audio transmission to the communication center based on the input audio information, the audio transmission including the information identifying the desired destination.

14. A method according to claim 13, wherein the step of sending an audio transmission to the communication center is carried out using a radio frequency (RF) link.

15. A method according to claim 13, wherein the step of sending an audio transmission to the communication center is carried out by cellular telephone.

16. A method according to claim 12, further comprising the step of generating audible navigation instructions to the user based on the computed route.

17. A method according to claim 12, wherein the coordinates comprise a latitude and longitude of the desired destination.

18. A method according to claim 12, wherein the coordinates comprise a street address of the desired destination.

19. A method according to claim 12, wherein the additional information further comprises real-time traffic information.

20. A method of enabling an on-board navigation system in an automobile to compute a route from a current position of the automobile to a desired destination, the method comprising the steps of:

establishing a two-way audio link between a user of the on-board navigation system and a communications center;

receiving at the communications center via the audio link, audio information identifying the desired destination from the user;

accessing a destination database in the communications center to determine coordinates of the desired destination based on the audio information identifying the desired destination;

establishing a non-audio data link between the on-board navigation system and the communications center;

transmitting from the communications center the coordinates of the desired destination and crime rate information to the on-board navigation system via the data link; and using the on-board navigation system to compute the route from the current position of the automobile to the desired destination based on the received coordinates of the desired destination and the crime rate information.

21. A method according to claim 20, wherein the coordinates comprise latitude and longitude information.

22. A method according to claim 20, wherein the coordinates comprise a street address.

23. A method according to claim 20, wherein the step of establishing a two-way audio link comprises the step of establishing a radio frequency (RF) link.

24. A method according to claim 20, wherein the step of establishing a two-way audio link comprises the step of establishing a cellular telephone link.

25. An on-board vehicle navigation system, comprising:

means for determining a current position of a vehicle;

means for receiving a data transmission from a communication center, the data transmission including coordinates of a desired destination and crime rate information; and means for computing a route from the current position of the vehicle to the desired destination based on the received coordinates, the crime rate information and the current position of the vehicle.

26. An on-board vehicle navigation system according to claim 25, further comprising:

means for initiating a bi-directional audio link between a user of the navigation system and the communications center;

means for inputting from the user voice information identifying the desired destination; and means for transmitting audio information identifying the desired destination to the communications center over the audio link.

27. An on-board vehicle navigation system according to claim 26, wherein the bi-directional audio link comprises a radio frequency (RF) link.

28. An on-board vehicle navigation system according to claim 26, wherein the bi-directional audio link comprises a cellular telephone link.

29. An on-board vehicle navigation system according to claim 25, wherein the coordinates comprise latitude and longitude information.

30. An on-board vehicle navigation system according to claim 25, wherein the coordinates comprise a street address.

31. An on-board vehicle navigation system according to claim 25, further comprising means for outputting audible navigation instructions to the user based on the computed route.

32. An on-board vehicle navigation system, comprising:

a processor;

a memory coupled to the processor;

a sensor subsystem coupled to the processor, wherein the processor is configured to compute a current position of the vehicle based on inputs received from the sensor subsystem and a street map database stored in the memory;

wherein the processor is further configured to:

receive a data transmission from a remote communication center, the data transmission including information locating a desired destination and secondary information, the secondary information including crime rate information; and compute a route from the current position of the vehicle to the desired destination based on the received data transmission and the current position of the vehicle.

33. An on-board vehicle navigation system according to claim 32, wherein the information locating the desired destination comprises a latitude and longitude of the desired destination.

34. An on-board vehicle navigation system according to claim 32, wherein the information locating the desired destination comprises a street address of the desired destination.

35. An on-board vehicle navigation system according to claim 32, wherein the information locating the desired destination comprises a street segment identifier.

36. An on-board vehicle navigation system according to claim 32, wherein the information locating the desired destination comprises a node identifier.

37. An on-board vehicle navigation system according to claim 32, wherein the secondary information comprises real-time traffic information further.

38. An apparatus for enabling an on-board navigation system in an automobile to compute a route from a current position of the automobile to a desired destination, the apparatus comprising:

means for establishing a two-way audio link between a user of the on-board navigation system and a communications center;

means for receiving at the communications center audio information identifying the desired destination provided by the user;

means for accessing a destination database in the communications center to determine a location of the desired destination based on the audio information identifying the desired destination;

means for establishing a data link between the communications center and the on-board navigation system; and means for transmitting from the communications center the coordinates of the desired destination and crime rate information to the on-board navigation system via the data link.

39. An apparatus according to claim 38, further comprising means for computing the route from the current position of the automobile to the desired destination based on the coordinates received from the communications center and the crime rate information.

40. An apparatus according to claim 38, wherein the information identifying the desired destination comprises latitude and longitude information.

41. An apparatus according to claim 38, wherein the information identifying the desired destination comprises a street address.

42. An apparatus according to claim 38, wherein the means for establishing a two-way audio link comprises a radio frequency communication system.

43. An apparatus according to claim 38, wherein the means for establishing a two-way audio link comprises a cellular telephone system.

* * * * *